(12) United States Patent
Jarrous et al.

(10) Patent No.: US 10,082,954 B2
(45) Date of Patent: Sep. 25, 2018

(54) CHALLENGE GENERATION FOR VERIFYING USERS OF COMPUTING DEVICES

(71) Applicant: INTERNATIONAL BUSINESS MACHINES CORPORATION, Armonk, NY (US)

(72) Inventors: Ayman Jarrous, Haifa (IL); Alexandra Shulman-Peleg, Givataim (IL); Eitan Menahem, Beer Sheva (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 204 days.

(21) Appl. No.: 14/845,285

(22) Filed: Sep. 4, 2015

(65) Prior Publication Data

US 2017/0068446 A1 Mar. 9, 2017

(51) Int. Cl.
*G06F 3/0488* (2013.01)
*G06F 21/31* (2013.01)
*H04L 29/06* (2006.01)

(52) U.S. Cl.
CPC ........ *G06F 3/04886* (2013.01); *G06F 21/316* (2013.01); *H04L 63/083* (2013.01); *H04L 63/102* (2013.01)

(58) Field of Classification Search
CPC . G06F 3/04886; G06F 21/316; H04L 63/102; H04L 63/083
See application file for complete search history.

(56) References Cited

U.S. PATENT DOCUMENTS

| 8,892,461 B2 | 11/2014 | Lau et al. |
| 2002/0091937 A1 | 7/2002 | Ortiz |

(Continued)

FOREIGN PATENT DOCUMENTS

WO    WO99/09512 A1    2/1999

OTHER PUBLICATIONS

List_of_related_IBM_applications, Nov. 25, 2015.
(Continued)

*Primary Examiner* — Joseph P Hirl
*Assistant Examiner* — J. Brant Murphy
(74) *Attorney, Agent, or Firm* — Daniel J. Swirsky; AlphaPatent Associates Ltd.

(57) ABSTRACT

Challenging a current user of a computing device by measuring characteristics of user actions sensed by a computing device, determining that the measurements meet a uniqueness condition with respect to corresponding measurements in a comparison set of actions, recording the user actions and their measurements in a set of challenge actions associated with an authorized user, and responsive to a challenge requirement to determine whether a current user of the computing device is the authorized user, selecting challenge actions associated with an authorized user, prompting the current user to perform the selected challenge actions that are then sensed by the computing device, measuring characteristics of the prompted actions, and determining that the measurements of the characteristics of the prompted actions meet a similarity condition with respect to measurements of corresponding characteristics of the selected challenge actions.

10 Claims, 4 Drawing Sheets

(56) References Cited

U.S. PATENT DOCUMENTS

| | | | |
|---|---|---|---|
| 2003/0005326 | A1 | 1/2003 | Flemming |
| 2003/0056100 | A1 | 3/2003 | Beatson |
| 2006/0259304 | A1 | 11/2006 | Barzilay |
| 2007/0097096 | A1 | 5/2007 | Rosenberg |
| 2007/0236330 | A1 | 10/2007 | Cho et al. |
| 2008/0113787 | A1* | 5/2008 | Alderucci ............... G06F 21/31 463/29 |
| 2010/0052851 | A1* | 3/2010 | Kaehler ................. G06F 3/017 340/5.81 |
| 2011/0088086 | A1 | 4/2011 | Swink |
| 2012/0103729 | A1* | 5/2012 | Finschi ................. B66B 1/468 187/247 |
| 2012/0254964 | A1 | 10/2012 | Kumar et al. |
| 2013/0239195 | A1 | 9/2013 | Turgeman |
| 2013/0288647 | A1 | 10/2013 | Turgeman |
| 2014/0019912 | A1 | 1/2014 | Zhang et al. |
| 2014/0049499 | A1 | 2/2014 | Huck |
| 2014/0096196 | A1 | 4/2014 | O'Connor et al. |
| 2014/0325223 | A1* | 10/2014 | Turgeman ........... H04L 63/1408 713/168 |
| 2015/0033310 | A1 | 1/2015 | Chen et al. |
| 2015/0040193 | A1* | 2/2015 | Clemons ................ G06F 21/40 726/4 |
| 2015/0082421 | A1 | 3/2015 | Flowers |
| 2015/0095829 | A1 | 4/2015 | Uno |
| 2015/0113481 | A1 | 4/2015 | Liu |
| 2015/0199504 | A1* | 7/2015 | Feng ..................... G06F 21/36 726/28 |
| 2016/0028730 | A1* | 1/2016 | Natarajan ............... G06F 21/31 726/6 |

OTHER PUBLICATIONS

IBM; "Discover Patterns of Authorization Denials to Detect Security Violations"; An IP.com Prior Art Database Technical Disclosure; http://ip.com/IPCOM/000152423; May 3, 2007, p. 1-3.

Disclosed Anonymously; "Method and System for Enhancing Security"; An IP.com Prior Art Database Technical Disclosure; http://ip.com/IPCOM/000207889; Jun. 15, 2011, p. 1-2.

IPCOM000216184; "Authentication of a user of a mobile electronic device by the use of 3D Facial Mapping"; An IP.com Prior Art Database Technical Disclosure; http://ip.com/IPCOM/000216184; Mar. 23, 2012, p. 1-2.

Harrison et al., "Tap-Sense: Enhancing Finger Interaction on Touch Surfaces", UIST'11, Oct. 16-19, 2011, pp. 1-8.

Feng et al., "Continuous Mobile Authentication Using Touchscreen Gestures", Computer Science Department, University of Houston and School of Computing and Information Sciences, Florida International University, 2012 IEEE, pp. 451-456.

Sae,-Bae et al., "Biometric-Rich Gestures: A Novel Approach to Authentication on Multi-Touch Devices", NYU-Poly, CHI, May 5-10, 2012, Austin, Texas, pp. 977-986.

Angulo et al., "Exploring Touch-Screen Biometrics for User Identification on Smart Phones", Karlstad University, J. Camenisch et al (Eds): Privacy and Identity 2011, IFIP AICT 375, pp. 130-143, 2012.

Mell et al., "The NIST Definition of Cloud Computing", National Institute of Standards and Technology, Special Publication 800-145, Sep. 2011, pp. 1-7.

Shi et al., "Implicit Authentication through Learning User Behavior", M. Burmester et al., (Eds): ISC 2010, LNCS 6531, pp. 99-113, 2011, 15 pages.

Margit Antal et Al., Identity Information Revealed From Mobile Touch Gestures, Studia Univ. Babes—Bolyai, Informatica, 10th Joint Conference on Mathematics and Computer Science, vol. LIX, Special Issue 1, May 21-25, 2014, Cluj-Napoca.

List_of_related_IBM_applications, Nov. 29, 2015.

* cited by examiner

CHALLENGE GENERATION FOR VERIFYING USERS OF COMPUTING DEVICES

BACKGROUND

There is often a need to ensure that a user of a computing device is the owner of the computing device or is otherwise authorized to use the computing device, such as when the user attempts to access a sensitive application or data that are stored on the computing device, or when the user attempts to use the computing device to remotely access a user-associated account, such as via a computer network. Where an individual is in possession of stolen credentials (e.g., via "phishing") of an authorized user of a computing device, such an individual may often use the stolen credentials to successfully pose as the authorized user when using the computing device.

SUMMARY

In one aspect of the invention a method is provided for challenging a user of a computing device, the method including measuring one or more characteristics of a user action sensed by a computing device, determining that the measurements of the characteristics meet a uniqueness condition with respect to measurements of corresponding characteristics of a corresponding action in a comparison set of actions, recording the user action and the measurements of the characteristics in a set of challenge actions associated with an authorized user, performing the measuring, determining, and recording for a plurality of different user actions associated with the authorized user, and responsive to a challenge requirement to determine whether a current user of the computing device is the authorized user, selecting one or more of the challenge actions associated with the authorized user, prompting the current user of the computing device to perform the selected challenge actions, wherein the prompted actions performed by the current user are sensed by the computing device, measuring one or more characteristics of the prompted actions performed by the current user, and determining that the measurements of the characteristics of the prompted actions performed by the current user meet a similarity condition with respect to measurements of corresponding characteristics of the selected challenge actions.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which.

DETAILED DESCRIPTION

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
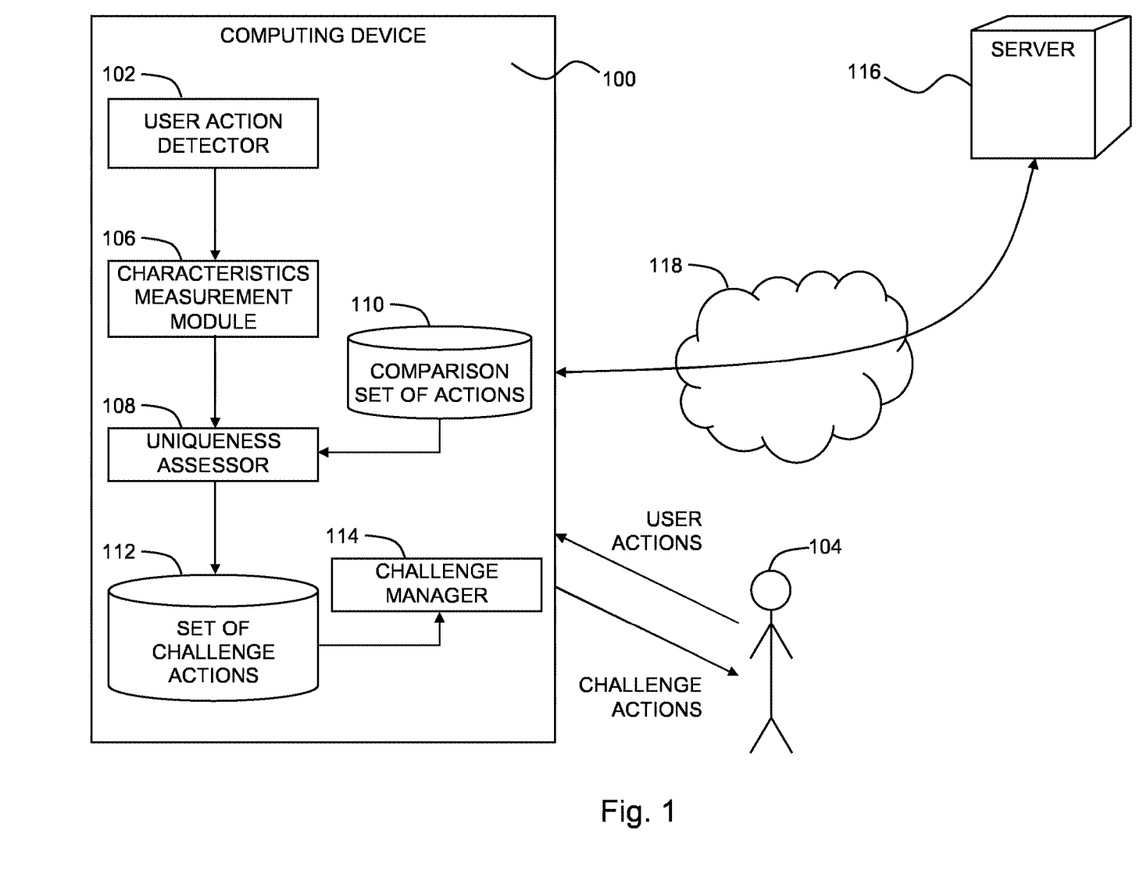
FIG. 1 is a simplified conceptual illustration of a system for challenging a user of a computing device, constructed and operative in accordance with an embodiment of the invention.

Reference is now made to FIG. 1, which is a simplified conceptual illustration of a system for challenging a user of a computing device, constructed and operative in accordance with an embodiment of the invention. In the system of FIG. 1, a computing device 100, which may, for example, be a cellular telephone or other mobile computing device, is preferably configured with a user action detector 102 which detects user actions that are sensed by computing device 100. Such user actions may include voice input via a microphone of computing device 100, tactile input via a touch screen of computing device 100, which may include handwriting and geometric input, keyboard input via a keyboard of computing device 100, geospatial input as indicated by a global positioning system (GPS) detector and/or accelerometer of computing device 100, and any other known type of user input that may be sensed by computing device 100 in accordance with conventional techniques. In one example, the user actions are in the form of two-dimensional geometric patterns that are input via a touch screen of computing device 100 when using an on-screen keyboard or when tracing a pattern among the graphic elements of a displayed set of graphic elements, such as in a 9-dot password grid of dots. In another example, the user actions are in the form of three-dimensional input patterns that combine two-dimensional geometric inputs with the spatial orientation of computing device 100 at the time of the two-dimensional geometric inputs. Such user actions are preferably detected by user action detector 102 subsequent to an authorized user 104 of computing device 100, such as the owner of computing device 100, having been identified as such in accordance with conventional techniques, where the user actions detected by user action detector 102 are assumed to have been performed by authorized user 104 except as otherwise described hereinbelow.

Computing device 100 is also preferably configured with, or otherwise remotely interacts with, a characteristics measurement module 106 which measures one or more predefined characteristics of the user actions detected by user action detector 102. Such characteristics may include the volume of voice input, angle and speed of tactile input, typing speed of keyboard input, and any other known type of characteristic that is associated with any of the user actions described hereinabove.

Computing device 100 is also preferably configured with, or otherwise remotely interacts with, a uniqueness assessor 108 which determines whether or not the measurements of the characteristics of any given user action measured by characteristics measurement module 106 meet a predefined uniqueness condition with respect to measurements of corresponding characteristics of a corresponding action in a comparison set of actions 110, where comparison set of actions 110 may include the actions and characteristic measurements associated with a reference set of users of other computing devices. If uniqueness assessor 108 determines that the measurements of the characteristics of any given user action measured by characteristics measurement module 106 meets the predefined uniqueness condition, uniqueness assessor 108 preferably causes the user action and the measurements of its characteristics to be recorded in a set of challenge actions 112 associated with authorized user 104, where computing device 100 is configured with set of challenge actions 112 or otherwise remotely interacts with set of challenge actions 112.

The system of FIG. 1 preferably operates as described hereinabove with respect to multiple user actions of various types and characteristics, where set of challenge actions 112 includes multiple user actions and measurements of their characteristics.

It may be desirable or necessary at any time during the operation of computing device 100 to issue a challenge to a current user of computing device 100 in order to determine whether the current user of computing device 100 is an authorized user of computing device 100, such as by determining that the current user of computing device 100 is, to a predefined degree of certainty, authorized user 104. Such a challenge requirement may, for example, arise where computing device 100 is configured to make this determination periodically. Additionally or alternatively, a particular software application hosted by computing device 100, or an operating system function of computing device 100, may be configured to issue such a challenge requirement when an attempt is made by the current user of computing device 100 to access them. Additionally or alternatively, a challenge requirement may be triggered when characteristics measurement module 106 measures the characteristics of a user action that characteristics measurement module 106 previously encountered, such as where the same word is input using a keyboard, and the measurements of the current user action differ by more than a predefined acceptable variance relative to the previous user action(s), or when this variance is exceeded a predefined number of times. Additionally or alternatively, a challenge requirement may be triggered in response to a failed attempt to determine whether the current user is the authorized user using any known technique or protocol.

In order to respond when such a challenge requirement arises, computing device 100 is also preferably configured with, or otherwise remotely interacts with, a challenge manager 114 which creates one or more challenges by selecting, such as at random, one or more of the challenge actions in set of challenge actions 112 and prompts the current user of computing device 100 to perform the selected challenge actions. User action detector 102 detects the prompted actions when they are performed by the current user and sensed by computing device 100, and characteristics measurement module 106 measures one or more predefined characteristics of the prompted user actions detected by user action detector 102. Challenge manager 114 then determines whether or not the measurements of the characteristics of the prompted actions performed by the current user meet a predefined similarity condition with respect to measurements of corresponding characteristics of the selected challenge actions. If the similarity condition is met, then the current user of computing device 100 is considered to have successfully responded to the challenge, whereupon the current user of computing device 100 and authorized user 104 may be considered to be the same individual.

Any of the elements described hereinabove with which computing device 100 may interact remotely may, for example, be hosted at a computer server 116 that is accessible via a computer network 118, such as the Internet, and accessed by computing device 100 in accordance with conventional techniques.

Figure 2A:
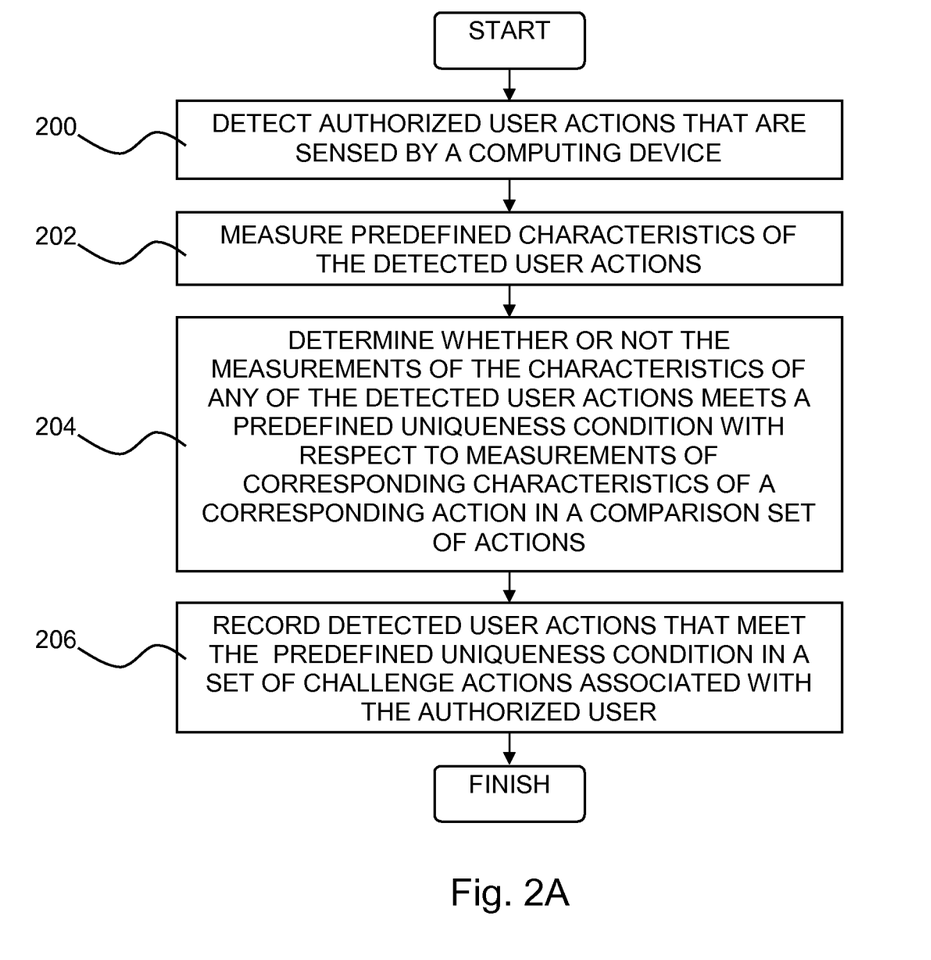
FIG. 2A is a simplified flowchart illustration of an exemplary method of operation of the system of FIG. 1, operative in accordance with an embodiment of the invention.

Reference is now made to FIG. 2A which is a simplified flowchart illustration of an exemplary method of operation of the system of FIG. 1, operative in accordance with an embodiment of the invention. In the method of FIG. 2A, user actions that are sensed by a computing device are detected subsequent to an authorized user of the computing device having been identified as such, where the detected user actions are assumed to have been performed by the authorized user (step 200). One or more predefined characteristics of the detected user actions are measured (step 202). It is determined whether or not the measurements of the characteristics of any of the detected user actions meets a predefined uniqueness condition with respect to measurements of corresponding characteristics of a corresponding action in a comparison set of actions (step 204), where the comparison set of actions may include the actions and characteristic measurements associated with a reference set of users of other computing devices. Detected user actions that meet the predefined uniqueness condition are recorded in a set of challenge actions associated with the authorized user (step 206). Steps 200-206 are preferably performed periodically or continuously during operation of the computing device such that the set of challenge actions includes multiple user actions and measurements of their characteristics associated with the authorized user.

Figure 2B:
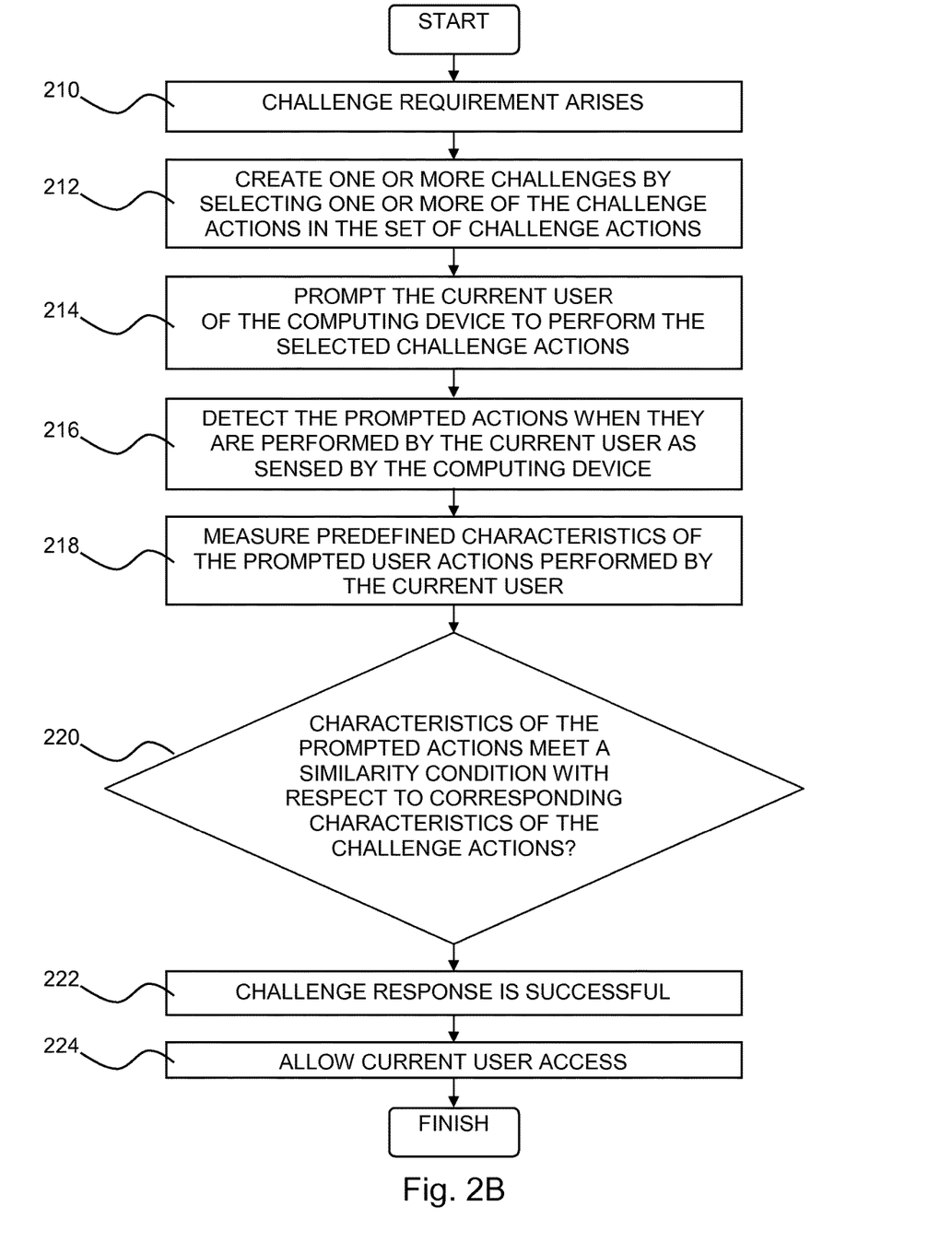
FIG. 2B is a simplified flowchart illustration of an exemplary method of operation of the system of FIG. 1, operative in accordance with an embodiment of the invention.

Reference is now made to FIG. 2B which is a simplified flowchart illustration of an exemplary method of operation of the system of FIG. 1, operative in accordance with an embodiment of the invention. The method of FIG. 2B may be performed concurrently with and independently from the method of FIG. 2A when a requirement arises to challenge the current user of a computing device, such as for the reasons described hereinabove with reference to FIG. 1. When a challenge requirement arises (step 210), one or more challenges are created by selecting, such as at random, one or more of the challenge actions in the set of challenge actions (step 212). The current user of the computing device is prompted to perform the selected challenge actions (step 214). The prompted actions are detected when they are performed by the current user as sensed by the computing device (step 216). One or more predefined characteristics of the prompted user actions performed by the current user are measured (step 218). If the measurements of the characteristics of the prompted actions performed by the current user meet a predefined similarity condition with respect to measurements of corresponding characteristics of the selected challenge actions (step 220), then the current user of the computing device is considered to have successfully responded to the challenge (step 222), whereupon the current user of the computing device and the authorized user of the computing device may be considered to be the same individual, and the current user of the computing device may be given access, such as to an account, service, and/or data that are associated with the authorized user of the computing device (step 224).

Various aspects of the system of FIG. 1 and the methods of FIGS. 2A and 2B may be additionally understood as follows. The challenges described hereinabove are generated in a knowledge-based fashion, based on collected statistics relating to the measurements of the user action characteristics. For example, consider a user who in most cases generates curves with high curvatures while combining letters. A fraudster may not be able to reproduce the same type of shape with the same type of pressure, contact area and speed of connection. Thus, an example for a good challenge would be one that will require a user to combine these letters that are located far from each other on a touch-screen keyboard, since it will allow a good differentiation between a fraudster and the authorized user.

To prevent replay attacks, the challenges presented to the current user preferably include novel combinations that were not recently input by the authorized user and are random or pseudo-combinations of the recorded challenge actions. Thus, for example, if the recorded challenge actions includes typing patterns of the words 'abcd', 'rbkf', and 'fdgr', a challenge may include the sequence 'abkf', as well as new combinations of letters and words that are not included in the recorded challenge actions, such as 'abkfx', and 'fx'.

A stream of challenges c1, . . . , cn may be generated in response to a challenge requirement, where each challenge includes a unique set of patterns that the current user must repeat, i.e., ci={p1, p2, . . . }. For example, p1 may be the pattern generated when typing the characters 'abc', and p2 may be the pattern 'fgd'.

In one example, the current user may be challenged to swipe or click on the set of points or letters that the current challenge, c_i, requires (e.g., swipe 'ab' and then 'fg' on the keyboard). While doing this, the current user may be challenged to draw on a touch screen of the computing device a set of geometric features learned from the authorized user's typing history. For example, the curvature of the shape connecting a set of dots as part of a challenge must match the curvature of the same shape previously generated by the authorized user.

S(c_i) may be used to represent the measurement the complexity of a challenge c_i, which is a function of the complexity of each of the patterns it is includes: S(c_i)=F (S(p1), S(p2), . . . , S(p_n)). The complexity of each pattern, i.e., S(p_i), measures the challenge p_i hardness by taking into account the uniqueness of each pattern's geometric features over the entire set of patterns. Thus, challenge hardness expresses how difficult it would be for an unauthorized user to correctly respond to the challenge.

When a pattern is entered by a current user in response to a challenge, the statistical significance is computed while taking into account the complexity of the challenge and the accuracy of the entered patterns.

There are several options for implementing F(•). In one embodiment, F(•) is a point-wise mutual information tutorial over the generated chain of patterns, i.e., F(c)=H(c)=PMI (p1, p2 . . . pn). Point-wise mutual information measures the magnitude of the difference between the actual probability of correctly satisfying the challenge patterns ci and cj, P(S(ci), P(S(cj)), by the authorized user, and the expected probability of randomly satisfying the challenges, on the basis of the probabilities of the individual user actions, under the assumption of independence of p(Ci) and p(Cj), where the probability of randomly satisfying individual events is measured over a population (e.g. of multiple users all different computing devices).

In another embodiment, F can be implemented using the Fisher combined probability test, or one of its extensions (e.g., the Brown's method). In this embodiment, the algorithm computes a test statistic $x^2 \sim \Sigma \ln(p\text{-val}\_i)$ for i=1 . . . n, where each p-val_i is the p-value for the ith null hypotheses (i.e., the legit user is the person that entered the pattern). When all the null hypotheses are true, and given that all the p-val_i are independent, $X^2$ has a chi-squared distribution with 2n degrees of freedom. This fact is used to determine the p-value for entire set of entered patterns of user actions.

In another embodiment, if p-val_i are not independent, F can be the non-parametric Friedman test. In this test, the algorithm counts pattern "success". A success is a case where S(p_i)>t, where t is a predefined hardness threshold and is in the range of [0,1]. The test statistic can be used to estimate the challenge's p-value, in a fashion similar to the Fisher combined probability test.

Independent of computing the challenge p-value, determining whether a current user of a computing device is the authorized user of the computing device may be based on a global g-threshold of the challenge's p-value. Thus, if p-value<g-threshold, the current user is considered to be the authorized user. The g-threshold can be adjusted to balance between the security level required, (e.g., the level of sophistication of the selected challenges), and the maximal degradation of user experience allowed.

Figure 3:
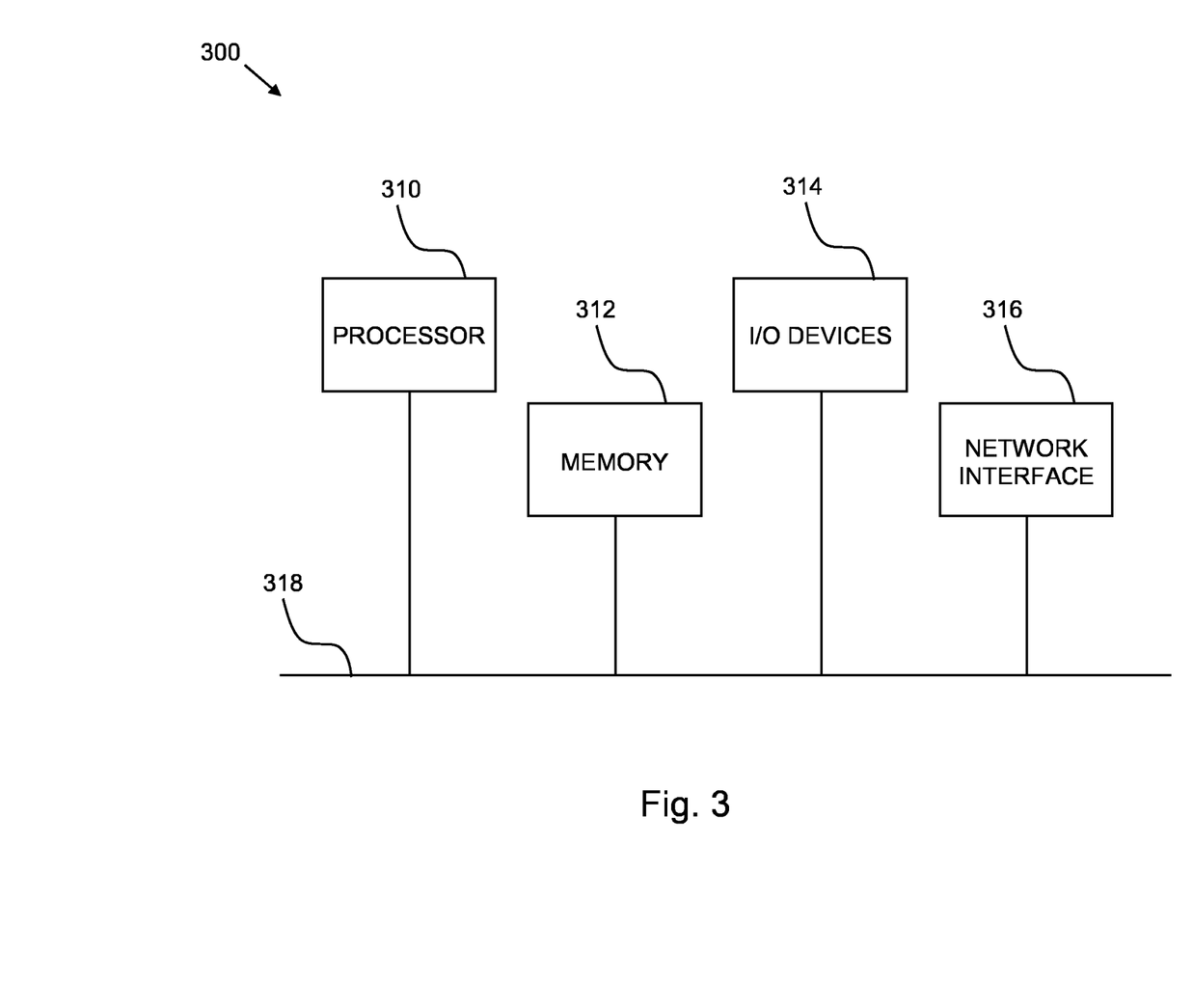
FIG. 3 is a simplified block diagram illustration of an exemplary hardware implementation of a computing system, constructed and operative in accordance with an embodiment of the invention.

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for challenging a user of a computing device, the system comprising:
   a characteristics measurement module configured to measure one or more characteristics of a user action sensed by a computing device and performed by an authorized user of the computing device subsequent to the authorized user of the computing device having been identified as the authorized user of the computing device;
   a uniqueness assessor configured to
      determine that the measurements of the characteristics of the user action performed by the authorized user of the computing device subsequent to the authorized user of the computing device having been identified as the authorized user of the computing device meet a uniqueness condition with respect to measurements of corresponding characteristics of a corresponding action in a comparison set of actions, and
      cause the user action and the measurements of the characteristics to be recorded in a set of challenge actions associated with the authorized user responsive to determining that the measurements of the characteristics meet the uniqueness condition; and a challenge manager configured to determine, responsive to a challenge requirement, whether a current user of the computing device is the authorized user, by selecting one or more of the challenge actions associated with the authorized user, prompting the current user of the computing device to perform the selected challenge actions, wherein the selected challenge actions performed by the current user are sensed by the computing device, and determining that the measurements of the characteristics of the selected challenge actions performed by the current user meet a similarity condition with respect to measurements of corresponding characteristics of the selected challenge actions, wherein the characteristics measurement module, the uniqueness assessor, and the challenge manager are implemented in any of a) computer hardware, and b) computer software embodied in a non-transitory, computer-readable medium.

2. The system according to claim 1 wherein the challenge manager is configured to determine whether the current user of the computing device is the authorized user responsive to a failed attempt to determine whether the current user is the authorized user.

3. The system according to claim 1 wherein any of the user actions are in the form of two-dimensional geometric patterns that are input via a touch screen of the computing device when using an on-screen keyboard of the computing device.

4. The system according to claim 1 wherein any of the user actions are in the form of two-dimensional geometric patterns that are input via a touch screen of the computing device when tracing a pattern among graphic elements of a displayed set of graphic elements.

5. The system according to claim 1 wherein any of the user actions are in the form of three-dimensional input patterns that combine two-dimensional geometric input patterns with a spatial orientation of the computing device at input time of the two-dimensional geometric input patterns.

6. The system according to claim 1 wherein the comparison set of actions includes actions and characteristic measurements associated with a reference set of users of other computing devices.

7. The system according to claim 1 wherein the challenge manager is configured to determine whether the current user of the computing device is the authorized user when an attempt is made by the current user of the computing device to access any of a) a software application hosted by the computing device and b) an operating system function of the computing device that are configured to trigger the challenge requirement responsive to the attempt.

8. The system according to claim 1 wherein the challenge manager is configured to determine whether the current user of the computing device is the authorized user when the measurements of the characteristics of one of the user actions that are detected at different times differ by more than a predefined acceptable variance.

9. A computer program product for challenging a user of a computing device, the computer program product comprising:

a non-transitory, computer-readable storage medium; and computer-readable program code embodied in the storage medium, wherein the computer-readable program code is configured to measure one or more characteristics of a user action sensed by a computing device and performed by an authorized user of the computing device subsequent to the authorized user of the computing device having been identified as the authorized user of the computing device, determine that the measurements of the characteristics of the user action performed by the authorized user of the computing device subsequent to the authorized user of the computing device having been identified as the authorized user of the computing device meet a uniqueness condition with respect to measurements of corresponding characteristics of a corresponding action in a comparison set of actions, record the user action and the measurements of the characteristics in a set of challenge actions associated with the authorized user responsive to determining that the measurements of the characteristics meet the uniqueness condition, perform the measuring, determining, and recording for a plurality of different user actions associated with the authorized user, and determine, responsive to a challenge requirement, whether a current user of the computing device is the authorized user, by selecting one or more of the challenge actions associated with the authorized user, prompting the current user of the computing device to perform the selected challenge actions, wherein the selected challenge actions performed by the current user are sensed by the computing device, measuring one or more characteristics of the selected challenge actions performed by the current user, and determining that the measurements of the characteristics of the selected challenge actions performed by the current user meet a similarity condition with respect to measurements of corresponding characteristics of the selected challenge actions.

10. The computer program product according to claim 9 wherein the computer-readable program code is configured to determine whether the current user of the computing device is the authorized user when the measurements of the characteristics of one of the user actions that are detected at different times differ by more than a predefined acceptable variance.

* * * * *